Figure 1:
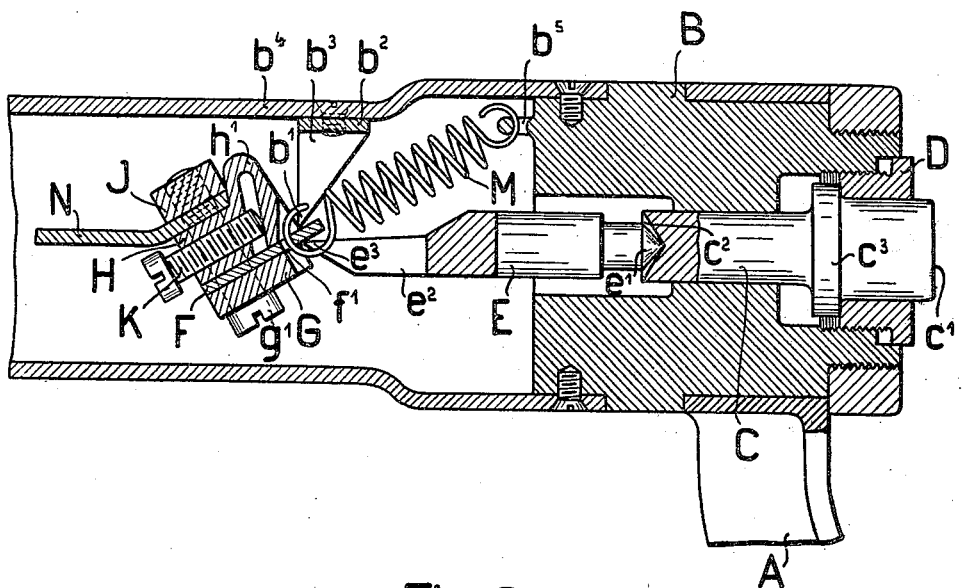

M. BARTHOLDY.
MEASURING INSTRUMENT.
APPLICATION FILED SEPT. 2, 1921.

1,425,438.

Patented Aug. 8, 1922.

Inventor
Max Bartholdy
by Knight Bros
Attys

UNITED STATES PATENT OFFICE.

MAX BARTHOLDY, OF ESSEN, GERMANY, ASSIGNOR TO FRIED. KRUPP AKTIENGE-SELLSCHAFT, OF ESSEN-ON-THE-RUHR, GERMANY.

MEASURING INSTRUMENT.

1,425,438. Specification of Letters Patent. Patented Aug. 8, 1922.

Application filed September 2, 1921. Serial No. 497,988.

*To all whom it may concern:*

Be it known that I, MAX BARTHOLDY, residing at Essen, Germany, a citizen of the German Republic, have invented a certain new and useful Improvement in Measuring Instruments, of which the following is a specification.

This invention relates to measuring instruments which have a lever, mounted on knife-edges through the medium of bearing surfaces, and in which the bearing surfaces are formed by the aid of a smooth plate projecting from the body of the lever. The object of the invention is to provide a measuring instrument of this kind in which the distance apart of the base lines of the bearings can be varied within the required limits and this variable adjustment accomplished in a particularly simple and advantageous way.

Figure 2:
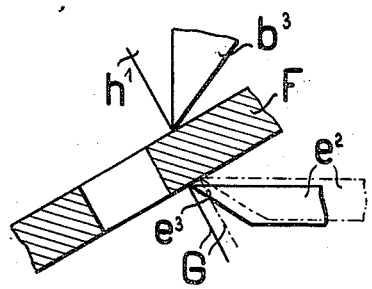

In the drawings is represented as an example of an embodiment of the invention, a caliper gauge and in which:

Fig. 1 is a central longitudinal section of the gauge constructed in accordance with this invention, certain parts being broken off and, Fig. 2 is an enlarged detail view of a part of Fig. 1.

In the drawings, one end of the semi-circular frame A of the gauge carries a measuring bolt C, which is axially movable in a substantially cylindrical member B. A collar $c^3$ formed on the bolt C bears against an adjustable bushing D screw-threaded into the member B. The measuring bolt C has a gauge surface $c^1$ at one end and is provided with a conical recess $c^2$ at its other end. A bolt E is provided with a conical end $e^1$ which engages the conical recess $c^2$. The other end of the bolt E is formed into a two-pronged fork, one prong $e^2$ appearing in the drawing. The prongs $e^2$ are formed with knife-edges $e^3$ at their ends, which knife-edges lie in a common straight line. Arranged immediately adjacent and parallel to the knife-edges $e^3$ is another pair of knife-edges $b^1$, also lying in a common straight line and formed on a pair of wedge-shaped arms $b^3$, of a U-shaped bracket $b^2$. Only one of the arms $b^3$ can be seen in the drawing.

The bracket $b^2$ is bolted to the inner wall of a hollow cylindrical body $b^4$ which is rigidly secured to the member B and the free end of which (not shown) carries the graduations of the instrument.

Into the slot formed between the knife-edges $e^3$ and $b^1$, projects a thin plane-surfaced metal plate F, clamped between two members G, H, which form with a third member J a block or body of a lever or pointer N, which is held together by two screws $g^1$, only one of which appears in the drawing. The pointer of lever N plays over the graduations hereinbefore mentioned. The member H terminates in a spring arm $h^1$, this arm being disposed adjacent the knife-edges $b^1$. A screw K is mounted in the member H so as to be easily accessible from the outside, with its point bearing against the free end of the arm $h^1$, said screw stressing somewhat said arm in opposition to its natural spring.

The arm $h^1$, together with the plate F form the bearing for the knife-edges $b^1$, while the member G, together with the plate F, form the bearing for the knife-edges $e^3$. A tension spring M engages the plate F through a hole $f^1$ formed therein, while its other end engages an eye $b^5$ formed on the member B. Consequently the block G H J is pressed, with its bearing surfaces, against the knife-edges $b^1$ $e^3$ by the spring M, so that this block is held floating in the manner illustrated in Fig. 1.

After the parts are assembled as described, it is ascertained whether a displacement of the measuring bolt C through, for example $\frac{1}{1000}$ mm. corresponds to an angular movement of the pointer N so as to indicate the said amount on the scale. If it is found that a discrepancy prevails, or, in other words, if the pointer swings too far or not far enough, the screw K is either tightened up or backed off a slight amount.

When the screw K is tightened up, the spring end of the arm $h^1$ is still further pressed outwardly. In consequence thereof, the bearing lines for the knife-edges $b^1$ are displaced in the direction towards the outer edge of the plate F and by this means the distance between the base lines of the bearings for the edges $b^1$ and $e^3$ is increased. Since the spring M constantly presses the bearings against the edges $b^1$, $e^3$, the result of this adjustment will be, as will be obvious, that the block G H J will be turned, and consequently the pointer N, about the stationary knife-edges $b^1$, in an anti-clockwise direction.

This turning of the block is compensated for by screwing up the bushing D which results in a displacement of the bolt C and of the bolt E, to the left (Fig. 1) and thereby in a turning of the block G H J about the knife-edges $b^1$ in a clockwise direction (Fig. 2). The increase in the bearing distance causes a corresponding decrease in the movement of the pointer as this movement may be considered, for the measuring range in question, as a linear function of the bearing distance. If the pointer movement is to be increased, the bearing distance is reduced by unscrewing the screw K and backing out the bushing D slightly. It will be readily understood from the foregoing, in what manner these operations take place, and no further explanation is required therefore.

Claims—

1. A measuring instrument having a lever provided with a body, knife-edges forming bearings for said lever, a plate projecting beyond said body and forming bearing surfaces for said knife-edges, said body having an adjustable spring arm forming part of one of said bearing surfaces.

2. A measuring instrument having a lever provided with a body, knife-edges forming bearings for said lever, said body having two members, a plate carried between said members and projecting beyond them, said members together with said plate forming bearing surfaces for said knife-edges, one of said members forming a spring arm carrying the bearing surface portion of said member.

3. A measuring instrument having a lever provided with a body, knife-edges forming bearings for said lever, said body having two members, a plate carried between said members and projecting beyond them, said members together with said plate forming bearing surfaces for said knife-edges, one of said members forming an adjustable spring arm carrying the bearing surface portion of said member.

4. A measuring instrument having a lever provided with a body, knife-edges forming bearings for said lever, said body having two members, a plate carried between said members and projecting beyond them, said members together with said plate forming bearing surfaces for said knife-edges, one of said members forming a spring arm carrying the bearing surface portion of said member, a set screw on said member acting upon the free end of said spring arm in opposition to the natural spring of the latter.

The foregoing specification signed at Essen, Germany, this 29th day of July, 1921.

MAX BARTHOLDY.